(12) United States Patent
van Baar et al.

(10) Patent No.: US 8,570,319 B2
(45) Date of Patent: Oct. 29, 2013

(54) PERCEPTUALLY-BASED COMPENSATION OF UNINTENDED LIGHT POLLUTION OF IMAGES FOR PROJECTION DISPLAY SYSTEMS

(75) Inventors: Jeroen van Baar, Küsnacht (CH); Steven Poulakos, Zurich (CH); Rasmus Tamstorf, Los Angeles, CA (US); Markus Gross, Uster (CH)

(73) Assignee: Disney Enterprises, Inc., Burbank, CA (US)

( * ) Notice: Subject to any disclaimer, the term of this patent is extended or adjusted under 35 U.S.C. 154(b) by 657 days.

(21) Appl. No.: 12/828,137

(22) Filed: Jun. 30, 2010

(65) Prior Publication Data

US 2011/0175904 A1 Jul. 21, 2011

Related U.S. Application Data

(60) Provisional application No. 61/296,465, filed on Jan. 19, 2010.

(51) Int. Cl.
*G06T 15/00* (2011.01)

(52) U.S. Cl.
USPC ............ 345/419; 345/8; 345/58; 345/60; 345/420; 348/47

(58) Field of Classification Search
USPC .............. 345/8, 58, 60, 419, 420; 348/47
See application file for complete search history.

(56) References Cited

U.S. PATENT DOCUMENTS

| | | | |
|---|---|---|---|
| 5,161,013 A | 11/1992 | Rylander et al. | |
| 6,462,769 B1 | 10/2002 | Trowbridge et al. | |
| 6,567,083 B1 | 5/2003 | Baum et al. | |
| 6,630,996 B2 | 10/2003 | Rao | |
| 6,809,809 B2 | 10/2004 | Kinney | |
| 7,408,986 B2 * | 8/2008 | Winder | 375/240.12 |
| 7,440,004 B2 * | 10/2008 | Siegel et al. | 348/47 |
| 7,558,320 B2 * | 7/2009 | Winder et al. | 375/240.12 |
| 7,995,092 B2 * | 8/2011 | Lippey | 348/60 |
| 8,085,217 B2 * | 12/2011 | Slavenburg et al. | 345/8 |
| 8,339,333 B2 * | 12/2012 | Casner et al. | 345/58 |
| 2006/0268104 A1 | 11/2006 | Cowan | |
| 2007/0206155 A1 | 9/2007 | Lipton | |

(Continued)

OTHER PUBLICATIONS

Bimber, O., et al., "Projector-Based Augmentation", Emerging Technologies of Augmented Reality: Interfaces and Design, 2006, pp. 64-89.

Bimber, O., et al., "Compensating Indirect Scattering for Immersives and Semi-Immersive Projection Displays", Proceedings of the IEEE Virtual Reality, Mar. 25, 2006, 9 pages.

(Continued)

*Primary Examiner* — Phu K Nguyen
(74) *Attorney, Agent, or Firm* — Kilpatrick Townsend & Stockton LLP

(57) ABSTRACT

Where images are displayed such that unintended light is also included and that light cannot be fully subtracted from the displayed image, an image processor compensates by compensating for the remaining light using perceptual models. In some cases, the perceptual model includes a plurality of user sensitivities and computation is performed, at least in part, based on expected user sensitivity to light pollution in portions of the images. The perceptual model might include a contrast sensitivity function, threshold-vs-intensity, saliency prediction and visual masking. The model might include artist indications of view attention. A light pollution likelihood map might be used to reduce the amount of computation needed, using a likelihood measure to determine an amount of computation to perform.

25 Claims, 6 Drawing Sheets

(56) References Cited

U.S. PATENT DOCUMENTS

2008/0094528 A1    4/2008   Robinson
2008/0239067 A1   10/2008   Lipton
2008/0239068 A1   10/2008   Lipton
2009/0190210 A1    7/2009   Coleman
2009/0297797 A1   12/2009   Coleman

OTHER PUBLICATIONS

Mukaigawa, Y., et al., "Analytical Compensation of Inter-reflection for Pattern Projection", ACM, Nov. 2006, pp. 265-268.

Sheng, Y., et al., "Global Illumination Compensation for Spatially Augmented Reality", The Eurographics and Blackwell Publishing, Nov. 2, 2010, 29:387-396.

* cited by examiner

PERCEPTUALLY-BASED COMPENSATION OF UNINTENDED LIGHT POLLUTION OF IMAGES FOR PROJECTION DISPLAY SYSTEMS

CROSS REFERENCE TO RELATED APPLICATION

The present application claims priority to U.S. Provisional Application No. 61/296,465, filed Jan. 19, 2010 and entitled "Perceptually-Based Compensation of Unintended Light Pollution of Images For Projection Display Systems", the entire contents of which are herein incorporated by reference for all purposes.

FIELD OF THE INVENTION

The present invention relates to optical systems in general and in particular to image compensation to address light pollution as part of the display.

BACKGROUND OF THE INVENTION

In an ideal case, where a particular image is to be viewed by an audience, each area of a screen (or other projection-receiving surface) should reflect to the audience the desired color and intensity of light at the desired time. However, there are physical constraints that cause light pollution, where light pollution includes the reflection or re-reflection of light from one or more of those screen areas that includes light that was not intended to be reflected from that point. Typically, this "light pollution", an unintended leakage of light due to some physical property of the display system, might be due to curvature of the screen or ghosting in stereoscopic 3D display systems, wherein light intended for one eye is visible to the other eye and combines with the light that actually was intended for the other eye.

Light pollution in 3D display systems results in "ghosting"—an object that is slightly displaced between the two stereoscopic images in order to convey to the eyes its depth appears as a "ghosting image" when portions of on eye's image leak over to the other eye's image. In some cases, the light pollution is easily modeled. For example, it might be determined by empirical or other methods that a particular 3D display system leaks 10% of the right eye's image onto the left eye's image and 10% of the left eye's image onto the right eye's image due to imperfect polarization of projected or reflected light.

In a conventional approach to deghosting, the right eye's image is composited with a negative 10% of the left eye's image and the resulting composite is displayed. However, there is a problem for pixels in the right eye's image that are supposed to be darker than the light pollution from the left eye (or vice versa). This corresponds to attempting to subtract more light than is available, leaving the resulting composite image with negative light values. Of course, since negative light is impossible to achieve in any type of physical display device, the composite image retains some of the light pollution.

To deal with the remaining light pollution, some producers will modify the "black level" so that the darkest points of an image are not totally black, thus allowing for more subtraction. However, this reduces the dynamic range of the displayed images.

Another approach is to carefully direct and edit an image sequence that is being presented so that bright objects in the foreground of a scene do not appear in front of dark objects, thus lessening the instances of negative light values in the composite image. Unfortunately, this may unduly constrain directors, cinematographers, artists, etc. when they desire to use a large dynamic range of light in close proximity.

Yet another approach is to ignore the remaining light pollution and have the viewers mentally deal with the remaining ghosting. However, this can lead to optical fatigue, especially with feature length films.

The goal of most, if not all, display systems is to provide viewers with the highest possible quality viewing experience. Many factors determine the overall viewing quality, but an important one is quality reduction due to unintended light pollution onto (portions of) the intended image.

It is important to reduce the cognitive load on the viewers of the ghosting that cannot be eliminated by simple subtraction.

BRIEF SUMMARY OF THE INVENTION

Where images are displayed such that unintended light is also included and that light cannot be fully subtracted from the displayed image, an image processor compensates by compensating for the remaining light using perceptual models. In some cases, the perceptual model includes a plurality of user sensitivities and computation is performed, at least in part, based on expected user sensitivity to light pollution in portions of the images. The perceptual model might include a contrast sensitivity function, threshold-vs-intensity, saliency prediction and visual masking. The model might include artist indications of view attention. A light pollution likelihood map might be used to reduce the amount of computation needed, using a likelihood measure to determine an amount of computation to perform.

In a specific embodiment, images to be viewable on a display using a computer that are generated based on scene geometry obtained from computer-readable storage and animation data representing changes over time of elements of the scene geometry are generated by determining a desired one or more images to be displayed or by other image sources, determining, from the desired one or more images to be displayed and/or characteristics of a system that is to display the images, what image cross-over might be present, determining one or more compensated images representing an inverse of the images and cross-over such that the compensated images are calculated to result in approximately the desired images once displayed, where the compensated images include negative light values, setting the negative light values to a nonnegative value and using a perceptual model, adjusting the compensated images to reduce perception of the results of the setting step.

The cross-over might be from polarized 3D images, overlapping shutter times in shutter-based 3D imaging, from concave screen screen-to-screen reflections, or any process whereby light intended for one particular location can be perceived in another location.

The perceptual model can include a plurality of user sensitivities and wherein a computational effort associated with adjusting portions of the images is determined, at least in part, based on expected user sensitivity to light pollution in those portions of the images and include a contrast sensitivity function, threshold-vs-intensity, saliency prediction and visual masking.

Determining adjusting portions of the images process might also be driven in part by artist or technician input of an indication of expected user view attention.

DETAILED DESCRIPTION OF THE INVENTION

Figure 1:
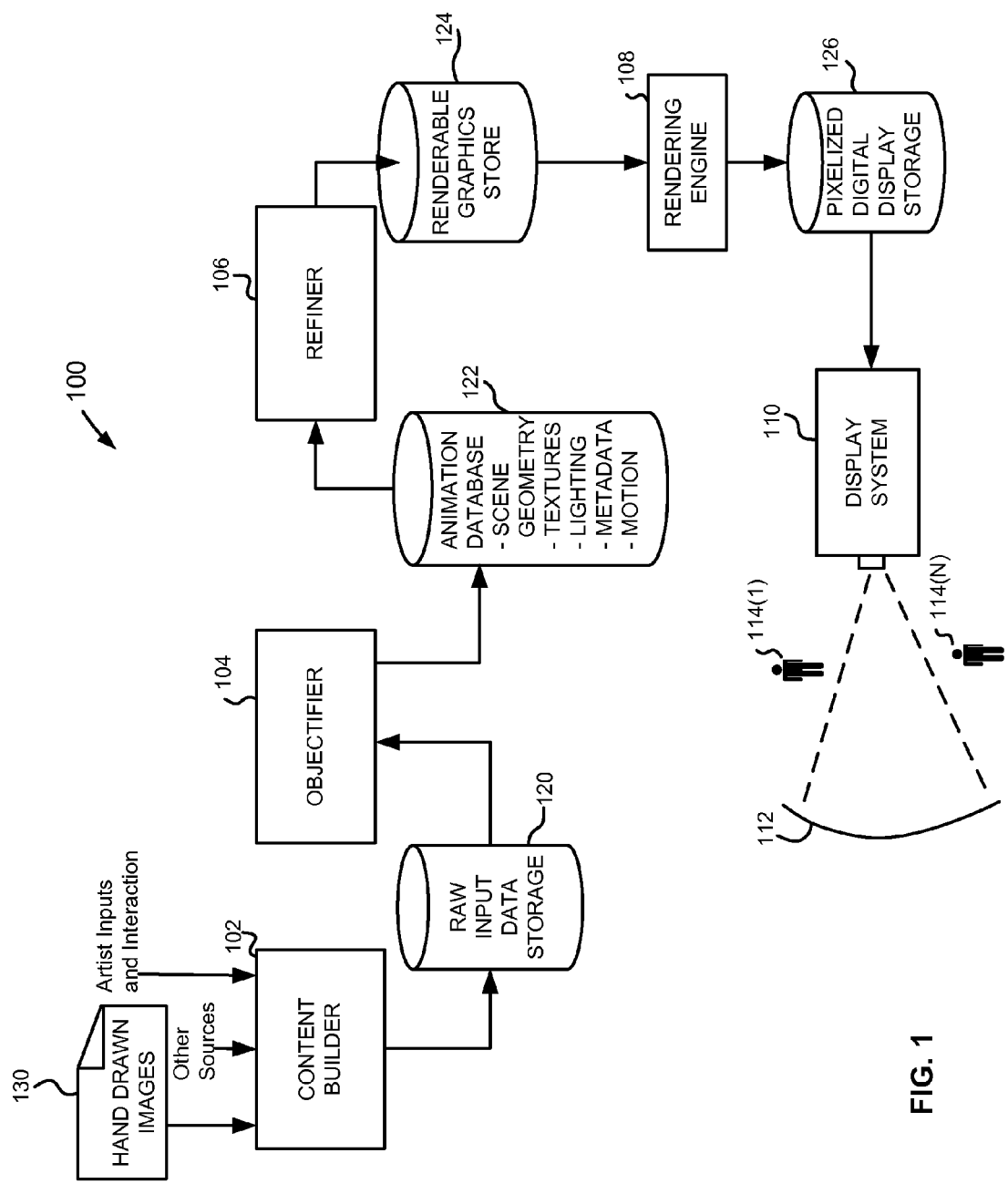
FIG. 1 illustrates an image processing system according to embodiments of the present invention.

An improved image processing system is described herein that can be used to process images to reduce perception of ghosting and/or used as part of a display system that processes the images and displays them.

Viewing stereoscopic 3D imagery already requires an increased cognitive load for the human visual system (HVS), due to the fact that two-view stereo is only an approximation to natural depth perception and stereoscopic 3D displays require a decoupling between focus and vergence, since the images are always displayed on the same plane in depth, i.e., the screen, so ghosting should not make it worse. Ghosting introduces a conflicting perceptual depth cue, also referred to as retinal rivalry, where the stereopsis process of the human visual system alternately attempts to fuse the intended and unintended edges to obtain a depth perception. This leads to further increasing the cognitive load. By performing perceptual deghosting, the resulting stereoscopic 3D images, specifically for large disparities, are more comfortable to watch.

Although the reduction in contrast due to scattering in concave screens does not increase the cognitive load, the quality of the viewing experience is nevertheless reduced. Especially for (semi-)immersive installations used in simulations and entertainment, the highest possible quality is still desirable. Perceptual compensation of the imagery not only avoids the need for a global reduction in contrast, it also preserves details that would be lost for a subtractive compensation.

As described herein, an image processor uses a perceptually-based method to compensate for the light pollution. The image processor can use a computational framework to compensate images in a perceptually optimal way prior to display, with the framework based on perceptual models derived from the properties of the HVS. To compute compensated images, the image processor applies the framework to the images and display parameters to predict the visibility of pollution. Then, it formulates a compensation image or dataset as an optimization problem, and solves according to what is referred to herein as a perceptual norm. The methods and apparatus described herein can be applied to the more general case of unintended leakage of light, but herein the main example of light pollution is eye-to-eye leakage in 3D projection systems.

In a specific process for generating a compensation image, an input image is considered by an image processor along with an indication of light pollution. It may be that the input image is expressed as a 2D array of pixel color values and the light pollution is also expressed as a 2D array of pixel color values. The output of the image processor might be a compensated image. The terminology used herein may refer to the ideal image that is preferably shown to the viewers (and would be, but for light pollution) as the "input image" and the light pollution is the "pollution image", while the image to be displayed is the "compensated image". In the case of 3D projection, the input image is one of a pair of images and the pollution image might be a function of the other image in the pair. In some cases, the pollution image might be a constant proportion of the opposite eye image, or the pollution might be more complicated. In a simple case, the compensated image is such that when the compensated image and the pollution image are added at the screen (due to leakage), the resulting image is exactly the ideal input image. Of course, that does not deal with negative light values (or imprecise modeling of the pollution).

In one embodiment of an image processor for generating the compensated image, a perceptual mask image is computed and used to exclude portions of the input image from processing, so that the compensated image can be generated faster than if all of the input image is processed. This perceptual filtering using the mask image can take into account a perception model provided to the image processor.

Additional details are provided below with reference to particular figures.

Hardware for Implementing an Image Processing System

FIG. 1 illustrates an image processing system 100 for creating, modifying and presenting animation, comprising a content builder 102, an objectifier 104, a refiner 106, a rendering engine 108, a display system 110 and a screen 112 on which the animation is projected for viewers 114. It should be understood that some of these elements can be implemented in software, hardware or a combination of hardware and software. The software could be separate modules or a larger system having several functions. Also, one or more of these elements could include (often not shown) memory, inputs, outputs, input devices and output devices for human, computer or electronic interfaces. It should be apparent from a reading of this description, that many of these elements can be implemented as a general purpose computer executing program code, while accepting inputs and issuing outputs and storing, reading and writing to memory allocated to that program code.

In the embodiment shown in FIG. 1, content builder 102 receives various inputs and generates raw input data, which is shown being stored in storage 120. Examples of inputs are hand-drawn images 130, artist inputs and interactions and other sources. The raw input data might include digitized images, entries by an artist to indicate how objects would behave, motion capture data, instructions, metadata, etc. Objectifier 104 processes the raw input data to construct representative objects, i.e., data structures that represent images in object form.

In one embodiment, an animation database 122 includes a collection of object descriptions (the scene geometry, 3D objects, 2D strokes), textures, lighting, motion information, such as paths that objects take over a series of frames. For example, the animation database might include storage for a collection of objects that are parts of a character and storage for motion information describing how each of those objects moves from frame to frame. In an extremely simple case, the animation database might indicate that the scene geometry includes a textured, static background, a blue cube having an edge length of 4 units of length in the virtual space, and motion data to indicate that the cube does not rotate but translates 2 units up and 1 unit to the left for three frames, then stops and drops with a specified rotation for the next 10 frames. In a much more complicated case, the animation database includes all of the objects needed to describe a scene outside a French bistro, with two characters (made up of thousands of body elements) sitting at a table and carrying on a conversation. Additionally, animation database 112 might include metadata not about the scenes to be generated, per se, but information about how the other data was generated and/or edited, for use in subsequent processing steps and/or editing steps. The animation database might be implemented in any manner of data structure and/or storage, and need not be stored in a highly-structured database management system, so long as the animation data is electronically readable.

Refiner 106 processes data from animation database 122 to refine the animation. For example, refiner 106 might include a module for determining occlusions, a module for filling in details, and a module for display compensation.

Display compensation might be done for concave screens (to compensate for screen-to-screen reflections not dealt with for flat screens), for stereoscopic presentations (to compensate for ghosting from the image bound for one eye onto the image bound for the other eye) and other display compensation. Thus, refiner 106 might have inputs for screen parameters, as well as storage for screen parameters, artist inputs, technician inputs, and the like, as might be useful for refining an animation. Other uses might include live action or content captured with a camera or pair of cameras.

The output of refiner 106 is to a store 124 for renderable graphics data. It may be in some embodiments, that animation database 112 is used for pre-refined animation and post-refined animation. Either way, rendering engine 108 can take the renderable graphics data and output pixelized digital display data that is stored in storage 126. Rendering engine 108 can run in real-time or not. The pixelized digital display can be in a raw form, such as a 2D pixel array with dimensions specified by a maximum resolution (e.g., 1920×1280, 1280×720), with each element of the array representing a pixel color value (often three or four "component" values). The pixelized digital display data might also be compressed, but the storage format need not be detailed here.

The pixelized digital display data is readable by projection system 110, which then projects the image sequences for viewing. It may be that the pixelized digital display data includes more than just arrays of pixel values, as it might include other data useful to the projection system, such as some of the data used in processing, assumptions about the screen, etc. Also, projection system 110 might also be provided with one or more synchronized audio tracks. In many cases, an animation is created by one entity, such as a filmmaker and the pixelized digital display data is distributed to a presenter in the form of digital transmission, storage on medium and transported to the presenter, such as a theater proprietor, DVDs transported and sold to end customers for small-scale viewing, medium provided to broadcasters, etc. As such, the generation of the animation might be done by one party independently of what a recipient of the medium and/or transmission does for the presentation. However, the animation process might be informed by actual or presumed details of how the presentation is to occur. As one example, the compensation might vary for varying projectors. As another example, the resolution and color depth might vary at the rendering engine (and/or elsewhere) based on formats used by presenters (such as DVD formats, vs. standard broadcast format, vs. theatre presentation).

Also the animation path, artist inputs can be accommodated. "Artist" can refer to any user that provides input, such as a graphic artist, an animator, a director, a cinematographer, their assistants, etc. Different skill levels can be accommodated. For example, not many animation skills are needed to input scanned drawings, but more skills are needed to provide inputs to the look of a particular key frame.

Figure 2:
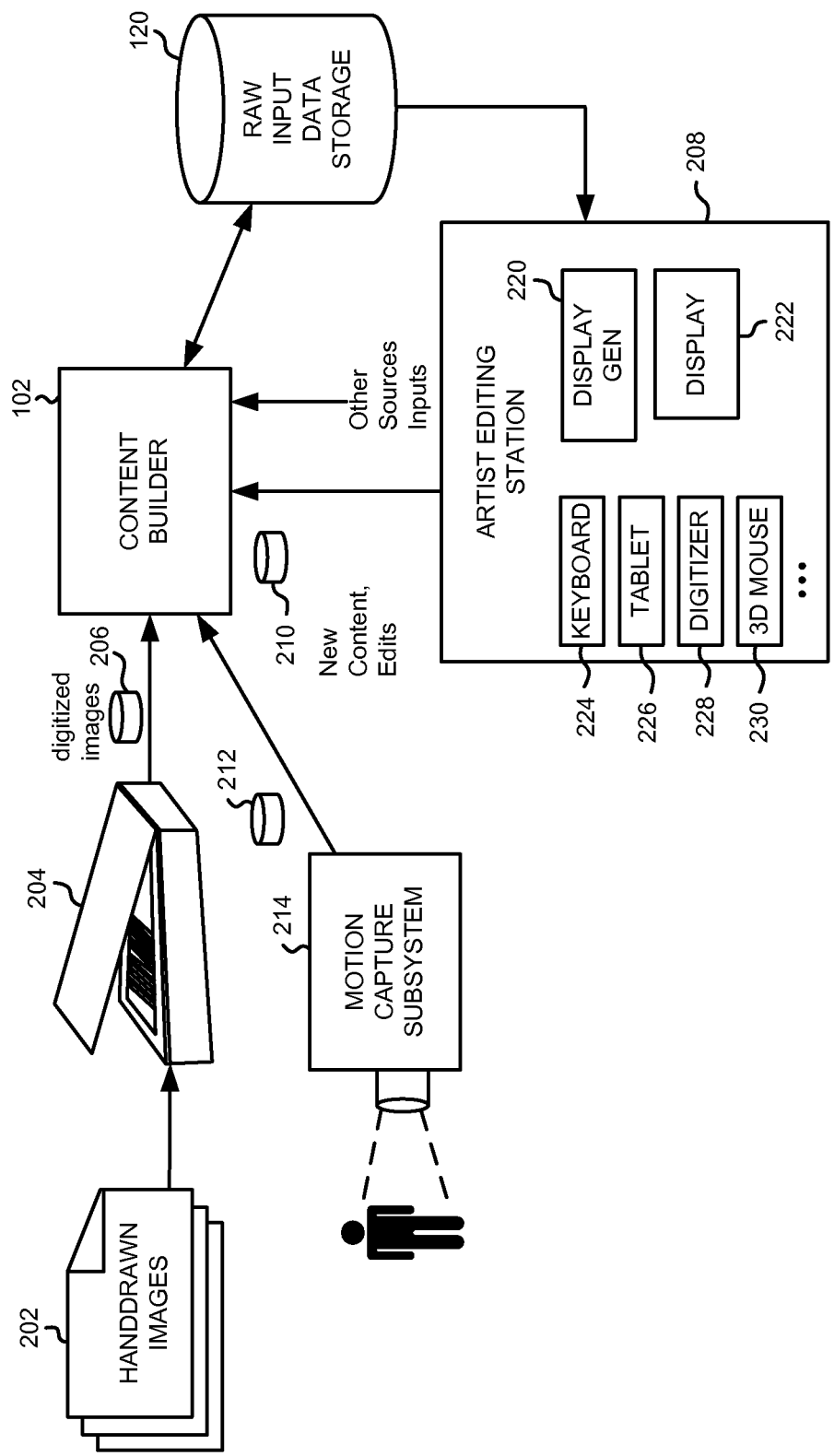
FIG. 2 illustrates elements of image processing system in more detail.

FIG. 2 illustrates elements of image processing system 100 in more detail. In the examples shown there, content builder 102 receives digitized images 206 from a scanner 204 when scanning hand-drawn images 202. Content builder 102 can also receive new content and edits to existing content as inputs 210 from an artist editing station 208, as well as motion capture data 212 from a motion capture subsystem 214. As illustrated, artist editing station 208 includes a keyboard 224, a tablet 226, a digitizer 228, a 3D mouse 230, a display generator 220 and a display 222. Using artist editing station 208, an artist can view the raw input data and make changes to the inputs. Artist editing station 208 might also be configured to allow for artist editing of the raw input data directly, but usually it is more convenient and/or intuitive to allow the artist to modify the inputs. For example, rather presenting a display of what the raw data represents on display 222 and requiring the artist to modify the data structures in storage 120 that represent a motion capture data point when the artist determines that something doesn't look right, it might be preferred to provide the artist with tools to specify modifications to the motion capture process (add, delete points, recapture, etc.) and have content builder 102 rebuild the raw data. This frees the artist to make artistic changes at a higher level, while providing fine control and not requiring data management experience.

In operation, multiple artists and others might edit the data in multiple rounds until the acceptable raw data is achieved. In some embodiments, as explained below, an editing station might allow for multiple stages of editing.

Figure 3:
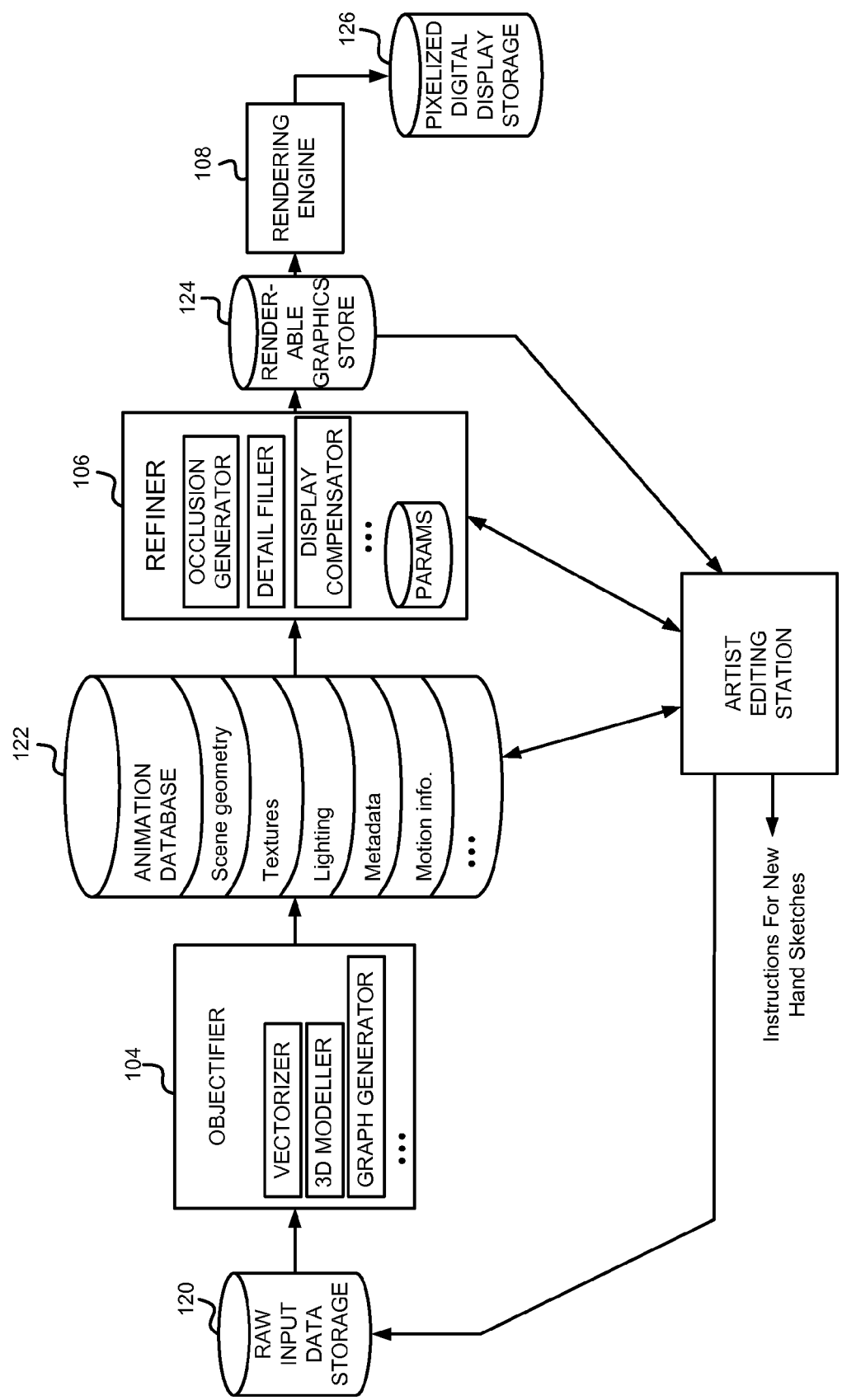
FIG. 3 illustrates elements of image processing system in other detail including an editing station.

FIG. 3 illustrates elements of image processing system 100 in other detail illustrating such as an editing station 300. As illustrated there, editing station 300 is coupled to raw input data storage 120 to write new raw input data (and could read), coupled to animation database 122 to read and write animation data, coupled to storage 124 to read renderable graphics, and coupled to read and write parameters for refiner 106. As illustrated, objectifier 104 processes the raw input data to populate animation database 122, refiner 106 refines the (at least some of the) contents of animation database 122 and outputs it as renderable graphics, which rendering engine 108 can produce as pixelized digital display data. Thus, in concept, an entire feature film can be specified by the contents of animation database 122, it can be rendered in whole or part, reviewed at an editing station and modified. Ideally, the tools provided at the editing station are suited to high-level editing and are intuitive with what the artists are providing. In some cases, the editing station might generate instructions for additional operations needed to obtain new or additional raw input data, such as additional hand-drawn sketches and additional motion capture or CGI processing.

Figure 4:
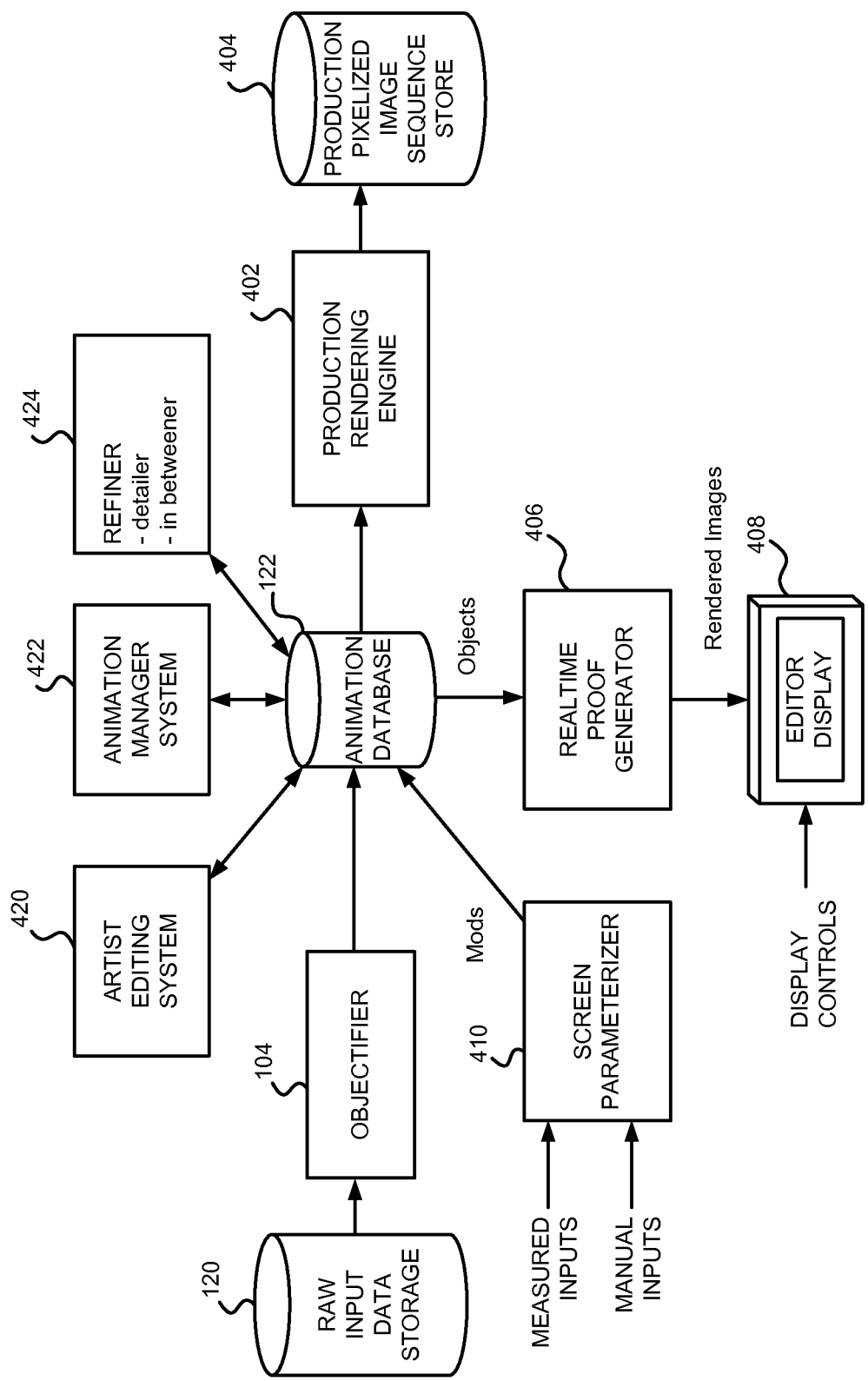
FIG. 4 illustrates a variation wherein an animation database forms central storage for various processing and edits.

FIG. 4 illustrates a variation wherein the animation database forms the central storage for various processing and edits. As illustrated there, raw input data from storage 120 is read by objectifier 104 and written to animation database 122, as in the previous example. However, the various editors edit to animation database 122, which can then be the source for a production rendering engine 402 that renders production-quality and writes to production pixelized image sequence store 404, as well as the source for real-time proof generator 406 (which can be a lower resolution and/or quality renderer)

that outputs rendered images to an editor display 408. As illustrated there, animation database 122 might receive screen information from a screen parameterizer 410 that determines, from measured inputs and/or manual inputs, parameters about the screen for which the rendering is to occur—such as its distance from the projector lens, its radius of curvature, the cross-over illumination from one stereoscopic image to another (such as cross-pollution of polarized images). Other changes can come from an artist editing system 420, an animation manager system 442, and/or a refiner 424. Artist inputs might be converted to raw input data, but typically enough information would be available to generate objects from the artist inputs.

Figure 5:
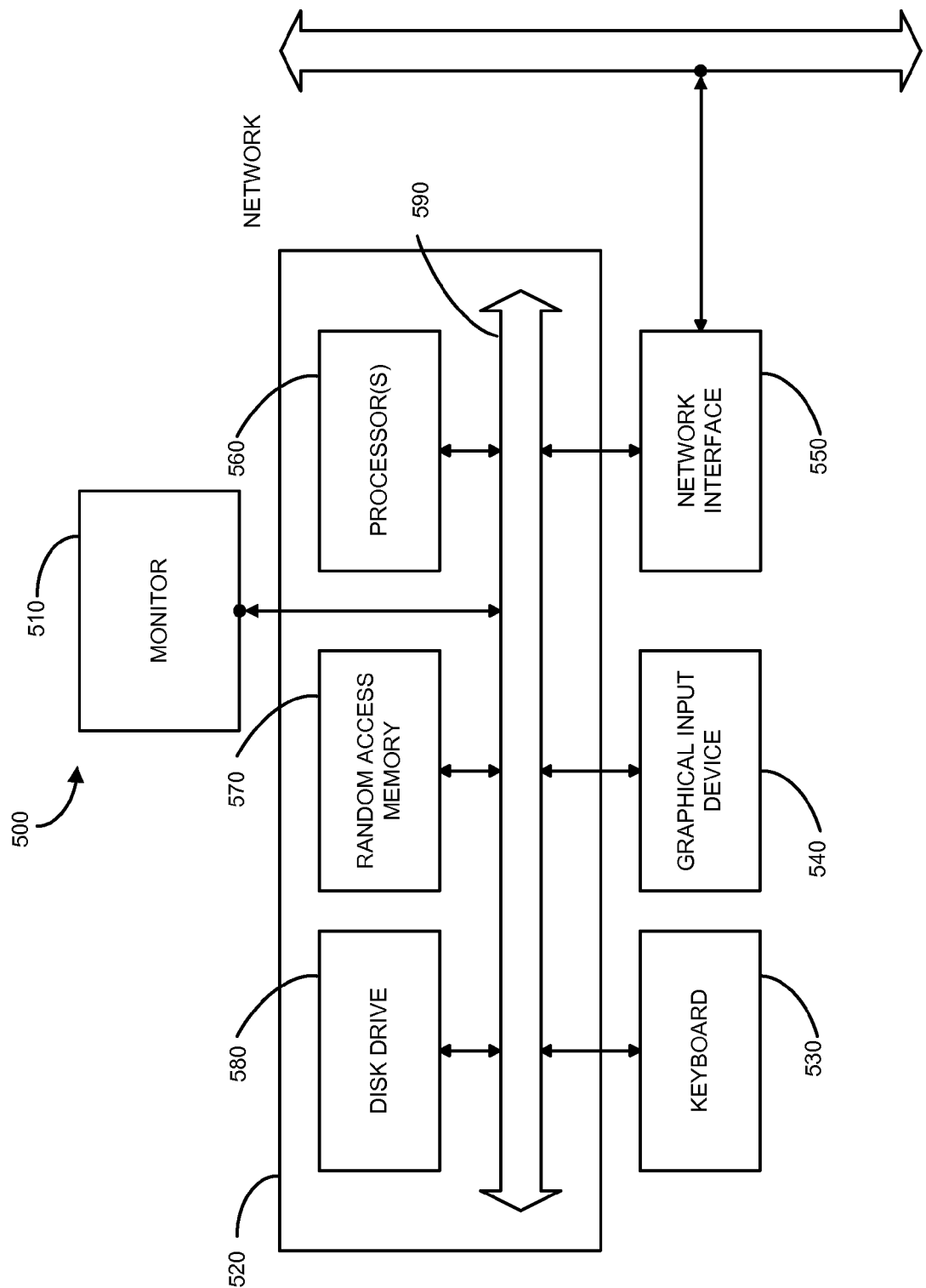
FIG. 5 illustrates an example artist editing system usable for animation management according to an embodiment of the present invention.

FIG. 5 illustrates an example artist editing system 500 usable for animation management according to an embodiment of the present invention. In the presently described embodiment, artist editing system 500 typically includes a display/monitor 510, computer 520, a keyboard 530, a user input device 540, computer interfaces 550, and the like. Images can be input using a scanner (not shown), received over a network or other interface, stored in memory or hard disk storage, or drawn directly into the system where such functionality is provided and/or obtained from a data storage device depicted elsewhere. The interfaces and/or memory might also be used to provide the metadata about images, animation sequences and the like.

In various embodiments, display/monitor 510 may be embodied as a CRT display, an LCD display, a plasma display, a direct projection or rear projection DLP, a microdisplay, or the like. In various embodiments, monitor 510 may be used to visually display user interfaces, images, or the like as well as being part of an interactive environment that accepts artist inputs, shows results of animation generation and metadata, etc. and accepts further input.

In the present embodiment, user input device 540 is typically embodied as a computer mouse, a trackball, a track pad, a joystick, wireless remote, drawing tablet, voice command system, eye tracking system, and the like. User input device 540 typically allows a user to select objects, icons, text and the like that appear on the display/monitor 510 via a command such as a click of a button or the like as well as making moving inputs, such as signaling a curve or association of objects, drawing lines, etc.

Embodiments of computer interfaces 550 typically include an Ethernet card, a modem (telephone, satellite, cable, ISDN), (asynchronous) digital subscriber line (DSL) unit, FireWire interface, USB interface, and the like. For example, computer interfaces 550 may be coupled to a computer network, to a FireWire bus, or the like. In other embodiments, computer interfaces 550 may be physically integrated on the motherboard of computer 520 and/or include software drivers, or the like.

In various embodiments, computer 520 typically includes familiar computer components such as a processor 560, and memory storage devices, such as a random access memory (RAM) 570, disk drives 580, and system bus 590 interconnecting the above components. RAM 570 or other memory might hold computer instructions to be executed by one or more processors as a mechanism for effecting some functionality described herein that is implemented in software. In one embodiment, computer 520 includes one or more Core™ microprocessors from Intel. Further, in the present embodiment, computer 520 typically includes a UNIX-based operating system.

RAM 570 and disk drive 580 are examples of computer readable tangible media configured to store embodiments of the present invention including computer executable code implementing techniques described herein, data such as image files, object/scene models including geometric descriptions of objects, images, metadata about images and user inputs and suggestions, procedural descriptions, a rendering engine, executable computer code, and/or the like. Other types of tangible media may include magnetic storage media such as floppy disks, networked hard disks, or removable hard disks, optical storage media such as CD ROMS, DVDs, holographic memories, and/or bar codes, semiconductor memories such as flash memories, read only memories (ROMS), battery backed volatile memories, networked storage devices, and the like.

In various embodiments, artist editing system 500 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, a graphical processor unit or "GPU", may be used to accelerate various operations.

FIG. 5 is representative of a computer system capable of embodying the present invention. It will be readily apparent to one of ordinary skill in the art that many other hardware and software configurations are suitable for use with the present invention. For example, the computer may be a desktop, portable, rack mounted or tablet configuration. Additionally, the computer may be a series of networked computers. Further, the use of other micro processors are contemplated, such as Xeon™, Pentium™ or Itanium™ microprocessors from Intel; Turion™ 64 or Opteron™ microprocessors from Advanced Micro Devices, Inc; and the like. Further, other types of operating systems are contemplated, such as Vista™ or Windows XP™ or the like from Microsoft Corporation, Solaris™ from Sun Microsystems, Linux, Unix, or the like. In still other embodiments, the techniques described above may be implemented upon a chip or an auxiliary processing board. Many types of configurations for computational devices can be used to implement various methods described herein. Further, processing components having different levels of computational power, e.g., microprocessors, graphics processors, RISC processors, embedded processors, or the like can also be used to implement various embodiments.

Dataflow for Perceptual Compensation Framework

Figure 6:
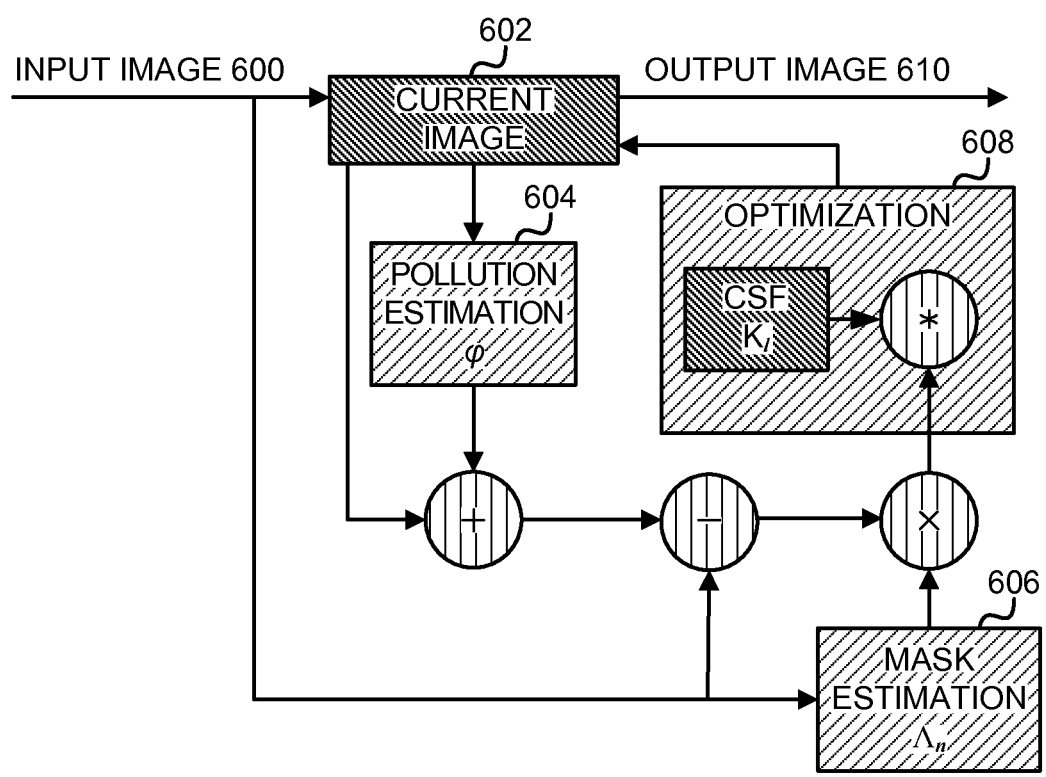
FIG. 6 illustrates elements of an image processor or compensation process that might perform perceptual compensation.

FIG. 6 illustrates elements of an image processor or compensation process that might perform perceptual compensation. This can be implemented as a set of processor instructions, dedicated hardware or other approach. In this description, for clarity, some processes are described as mathematical operations, but it should be apparent that each of these mathematical steps needs to be performed electronically, in some cases with user input or feedback and in some cases fully automatically from data available.

In some instances, the compensation can occur independently of the hardware shown in FIGS. 1-5, using other hardware and/or software executed by one or more processors. In some embodiments, the compensation is independent of image source.

In the following description, matrices are denoted with uppercase bold letters, while vectors are denoted with lowercase bold letters. Each of these can be stored in suitable memory structures. An image, I, can be represented by a vector data structure using an operator to convert an image structure into a vector structure, i.e., vec( ) that stacks the columns of the image into a single vector. Thus, x=vec(I). The inverse operation to get an image from a vector is denoted as I=array(x). Continuous functions are denoted with lowercase Greek letters.

Given one or more input images, the image processor illustrated in FIG. 6 can generate a compensated image 610 (for display or storage for later display) from an input image 600. As illustrated there, the input image 600 is stored in a current image store 602 and operated upon by a pollution estimator 604 and a mask estimator 606. Pollution estimator 604 determines a pollution function $\phi(\cdot)$ that represents the light pollution for every pixel in the image(s). $\phi(\cdot)$ may be a linear function of the input image and, if it is a linear function, it can be represented as a matrix $\Phi$. The output of pollution estimator 604 is added to the current image 602 and the residual with the input image is determined. Mask estimator 606 provides a mask that is multiplied by residual between the output of pollution estimator 604 that is added to the current image 602 and the input image. This filters the pollution spatially according to where it is deemed to be perceptually noticeable. This filtering can dramatically accelerate the compensation process by selecting only a few small areas of the image and imposing fewer constraints. The filtered output is then input to an optimizer 608 which computes an compensation image. This iterative process eventually yields a final compensation image which is defined to be the output image 610.

Denoting the displayed image as x, the observed image $x_{obs}$ is as shown in Equation 1.

$$x_{obs}=\psi(x)=x+\phi(x) \quad \text{(Eqn. 1)}$$

Ideally this image should be equal to the intended or desired image, $\bar{x}$, so optimizer 608 will solve a constrained optimization problem to find the compensation. In a particular embodiment, it solves the constrained least squares problem set out in Equation 2.

$$\arg\min_x \|\psi(x)-\bar{x}\|_{L_2}^2, s.t. 0 \leq x \leq 1 \quad \text{(Eqn. 2)}$$

The constraint ensures that the pixel values remain within the physically attainable value range, since no negative light can be displayed (x cannot be less than zero) and every displayor has a limited brightness (x cannot be greater than the maximum, in this case the maximum is scaled to 1). In the case of color images, Equation 2 can be solved for each color channel separately.

Equation 2 represents subtractive compensation, without dealing with the residual pollution. It is this residual pollution that the perceptual compensation addresses. Defining the residual r as $r=x+\phi(x)-\bar{x}$, and an abstract perceptual weighting function $\lambda(\cdot)$, the application of that to the process results in the operation shown in Equation 3.

$$\arg\min_x \|\lambda(r)-\bar{x}\|_{L_2}^2, s.t. 0 \leq x \leq 1 \quad \text{(Eqn. 3)}$$

In a particular embodiment which makes Equation 3 more amenable to efficient computation the perceptual weighting function $\lambda(\cdot)$ is modeled as the product of a non-linear term, computed once, and represented as a diagonal matrix $\Lambda_l$ and a linear term represented as a matrix $\Lambda_l$, represented as $\lambda(r) \approx \Lambda_n \Lambda_l r$. Equation 3 can thus be written as the minimization procedure shown in Equation 4.

$$\arg\min_x \|\Lambda_n \Lambda_l r\|_{L_2}^2, s.t. 0 \leq x \leq 1 \quad \text{(Eqn. 4)}$$

In this embodiment, the contrast sensitivity function (CSF), which describes the varying sensitivity of the HVS over frequencies in the spectral domain, is used. In other embodiments, other functions might be used. The CSF suggests that the visual system is most sensitive to a mid-range of frequencies and less sensitive for lower and higher frequencies. The residual pollution can be weighted accordingly.

The weighting by the CSF can be represented as a matrix $\Lambda_l$ by taking $F^{-1}\Omega F$, where $\Omega$ is a matrix with the coefficients of the CSF along its diagonal and $F=F_y \otimes F_x$ is the two-dimensional discrete Fourier transform. The multiplication of the residual r with $\Lambda_n \Lambda_l$ coefficients is a weighted $L_2$ norm, which is denoted herein as a "perceptual norm".

A simplistic approach is to generate $\Lambda_l$ but that is an n-square matrix where n is the number of pixels in the input image, and in general it is a dense matrix. While this works for small n, it is impossible to even just store it on most current computers for normal sizes of n. We thus exploit the structure of the problem to avoid the need to explicitly generate $\Lambda_l$.

Perceptual Optimization

The form of Equation 4 corresponds to a convex minimization with bound constraints. An "active set" method to solve convex quadratic programming problems with bound constraints using conjugate gradients (CG) in combination with gradient projection (GPCG) is known. In GPCG, the CG are used to solve a subproblem defined by the active set represented in Equation 5, which represents the so-called face of the current feasible set determined by the constraints shown in Equation 6.

$$A(x)=\{i: x_i=l_i \text{ or } x_i=u_i\} \quad \text{(Eqn. 5)}$$

$$\Omega=x \in R^n : l \leq x \leq u \quad \text{(Eqn. 6)}$$

The gradient projection is used to move to a different face, with gradients $\partial q(x)$ and the projected gradient defined as in Equation 7.

$$[\nabla_\Omega q(x)]_i = \begin{cases} \partial_i q(x) & \text{if } x_i \in (l_i, u_i) \\ \min\{\partial_i q(x), 0\} & \text{if } x_i = l_i \\ \max\{\partial_i q(x), 0\} & \text{if } x_i = u_i \end{cases} \quad \text{(Eqn. 7)}$$

For the solution $x^*$, the following is true: $\nabla_\Omega q(x^*)=0$. The image processor could use the GPCG method directly if the matrix $\Lambda_n \Lambda_l$ could be generated and stored. By the convolution theorem, the component-wise multiplication of CSF coefficients in the spectral domain is equal to convolution with some CSF kernel in the spatial domain. Thus, the image processor can perform the convolution shown in Equation 8.

$$\arg\min_x \|\Lambda_n(K_l * r)\|_{L_2}^2, s.t. 0 \leq x \leq 1 \quad \text{(Eqn. 8)}$$

This is similar in structure as deconvolution problems, which are inverse problems that aim to reconstruct some true signal from corrupted observations given a known corruption kernel. 2D convolution yields block Toeplitz with Toeplitz blocks (BTTB) structure for linear systems, and by taking a circulant extension of the BTTB matrix, matrix-vector multiplications can then be performed using 2D FFTs. This can then be applied to compute $\Lambda_l r$ on demand and thus omit the need to store $\Lambda_l$.

Since $\Lambda_l$ is symmetric, but not positive definite, the image processor can generate a solution to Equation 4 via the so-called normal equations $(PC)^*(PC)x=(PC)\bar{x}$.

Perceptual Pollution Prediction

In the procedure described above, all pixels of an image are used as variables in the optimization, making the problem very large in dimension. Depending on the viewing conditions, the pollution in certain locations may not be noticeable at all. It therefore would make sense to solve the optimization problem only for those areas where the pollution is actually noticeable. This has the potential to achieve large performance improvements, since likely the size of the area or areas where the pollution is noticeable is small compared to the overall image dimensions.

As explained above, this can be implemented in the image processor as one part of the filter function λ(•). The filter function λ(•) can be constructed from different subfunctions. The non-linear subfunctions are combined into a single binary mask and represented by a diagonal matrix $\Lambda_n$ before being applied in Equation 4.

Three example perceptual metrics are described that, when combined, provide a pollution visibility prediction, and they are: (1) threshold-vs.-intensity metrics, (2) visual masking metrics, and (3) saliency metrics.

Threshold-Vs.-Intensity Metrics

Threshold-vs.-Intensity (TVI) describes the required contrast threshold values to discriminate a foreground luminance given a background luminance. A straightforward prediction of pollution visibility is performed by the image processor by comparing whether the pollution contribution is above threshold values given by the TVI. Since the TVI is defined for Luminance, available CIE XYZ measurements can be used by the image processor for this step, if available, or RGB values can be transformed into Luminance values.

A conventional approach to determining which pixels have residual pollution $x_{obs}-\bar{x}$ above a threshold, as expressed by Equation 9.

$$\delta(x)=x_{obs}-\bar{x}>TVI \tag{Eqn. 9}$$

For cinematic settings, the luminance levels are in the mesopic range and a blend between photopic and scotopic models can be used.

Visual Masking

Visual masking, $\upsilon(x)$, describes the reduction in contrast sensitivity due to interaction between the differently tuned mechanisms the human visual systems relies on. Studies have shown that there are at least six different frequency selection mechanisms. Each mechanism is further tuned for different orientations. Pollution may be masked due to the mechanisms' interactions.

Saliency

Bottom-up saliency, $\gamma(x)$, uses a model based on the center-surround lay-out of ganglion cells in human eyes. Pollution tends to be most noticeable for those objects that are most salient.

A model for computing saliency using the image processor can be extended to incorporate information about motion. In order to compute the velocity information to use in the extended saliency model, the image processor might first determine pixel displacements between consecutive images in a sequence. In the case of 3D animation, this information can be determined exactly. Using pixel shaders, it is easy to track to which pixel the geometry is projected from frame to frame. In the case of existing imagery, the pixel displacements can be determined from image information, such as by using optical flow computations to compute these pixel displacements. The optical flow computation gives a horizontal and vertical component for each pixel. Since the direction of the displacements is not important, the image processor can first compute the magnitude of the optical flow. The single component displacements between consecutive frames in a sequence are then converted to degrees per second by taking the viewing parameters into account.

Pollution Prediction Map

The image processor computes the TVI map $\delta(x)$, the visual masking map $\upsilon(x)$ and the saliency map $\gamma(x)$. Before combining the three individual maps into a single pollution prediction map $\Lambda_n$, the image processor might first normalize each map and then applying an multiplication operator. The pollution prediction map $\Lambda_n$ can then be generated in the form shown in Equation 10.

$$\Lambda_n=(\delta(x) \times \upsilon(x) \times \gamma(x)) \tag{Eqn. 10}$$

According to this model, pollution is visible if the pollution contribution passes both the TVI and visual masking tests. Then the image processor weighs the remaining pollution with the saliency to determine whether the pollution occurs in a salient region.

Deghosting

The previous section introduced a general perceptual framework for compensating images in the presence of light pollution. In this section, the use of the framework specifically for stereoscopic 3D display systems is explained. As explained above, in stereoscopic 3D display systems the light pollution leads to ghosting. Rather than a single input, the input is a pair of input images, i.e., the left eye (L) image and the right eye (R) image. In this case, $\phi(•,•)$ is a function of two input images and with the pollution, the observed images are as indicated in Equation 11.

$$L_{obs}=\bar{L}+\phi(\bar{L},\bar{R})$$

$$R_{obs}=\bar{R}+\phi(\bar{L},\bar{R}) \tag{Eqn. 11}$$

$L_{obs}$ and $R_{obs}$ are the observed images in the presence of ghosting. In the simplest case, the ghosting is a constant percentage of the unintended eye image, denoted as $a_l$ and $a_r$ for left and right respectively. By defining x=vec(vec(L'), vec(R')) and $\bar{x}$=vec(vec($\bar{L}$), vec($\bar{R}$)), the ghosting problem returns to Equation 3, and the matrix C in this case has the form shown in Equation 12.

$$C = \begin{bmatrix} 1 & \cdots & 0 & a_r & \cdots & 0 \\ \vdots & \ddots & \vdots & \vdots & \ddots & \vdots \\ 0 & \cdots & 1 & 0 & \cdots & a_r \\ \hline a_l & \cdots & 0 & 1 & \cdots & 0 \\ \vdots & \ddots & \vdots & \vdots & \ddots & \vdots \\ 0 & \cdots & a_l & 0 & \cdots & 1 \end{bmatrix} \tag{Eqn. 12}$$

For stereoscopic 3D, the dimensions of the problem are now doubled in both directions. It is thus even more desirable to select only those areas for which the ghosting is noticeable and reduce the computational complexity. The next section explains which perceptual properties are included in the prediction computation for the case of ghosting in a specific embodiment.

Perceptual Ghost Prediction

The model for computing saliency $\gamma(x)$ from above can be further extended to incorporate information about disparities, this being especially important for stereoscopic 3D. In order to compute the disparity information to use in the extended saliency model, the image processor might first determine pixel displacements between the left and right images of stereoscopic image pair. In the case of 3D animation, this information can be determined exactly. Using pixel shaders, it is easy to track to which pixel the geometry is projected in each image. In the case of existing stereoscopic 3D imagery, the pixel displacements can be determined from image information, such as by using optical flow computations to compute these pixel displacements. The optical flow computation gives a horizontal and vertical component for each pixel. The optical flow can directly be used as a measure of the disparities. It can be assumed that the images have only horizontal parallax, and the vertical component of the calculated optical flow can be ignored.

Ghost Prediction Map

The image processor should compute $\delta(x)$, $\upsilon(x)$, $\gamma(x)$ for both left and right images. Before combining the three individual maps into a single ghost prediction map $\Lambda_n$, the image processor might first normalize each map and then applying an multiplication operator. In the case of both a left and right image, such as for stereoscopic 3D, the ghost prediction map $\Lambda_n$ for the left image can be written as in Equation 13, in contrast to Equation 10. A similar equation is available for the right image.

$$\Lambda_{n_{left}} = ((\delta(x)_{left} \times \upsilon(x)_{left} \times \gamma(x)_{right})$$ (Eqn. 13)

According to this model, ghosting is visible if the ghosting contribution passes both the TVI and visual masking tests. Then the image processor weighs the remaining ghosting with the cross-channel saliency to determine whether the ghosting is due to a salient region.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A method for generating images to be viewable on a display using a computer that are generated based on scene geometry obtained from computer-readable storage and animation data representing changes over time of elements of the scene geometry or other image sources, wherein the images so generated are expected to be used where cross-over is present, cross-over being the illumination of one portion of an image by light intended for another portion of the image or another image, the method comprising:
  determining a desired one or more images to be displayed;
  determining, from the desired one or more images to be displayed and/or characteristics of a display system that is to display the images, what image cross-over might be present;
  determining one or more compensated images representing an inverse of the images and cross-over such that the compensated images are calculated to result in approximately the desired images once displayed;
  where the compensated images include negative light values:
    a) setting the negative light values to a nonnegative value; and
    b) using a perceptual model comprising a perceptual weighting function, adjusting the compensated images to reduce perception of the results of the setting step; and
  storing the resulting images as the images to be displayed.

2. The method of claim 1, wherein the cross-over is cross-over from a stereoscopic pair of images.

3. The method of claim 1, wherein the cross-over is cross-over from concave screen screen-to-screen reflections.

4. The method of claim 1, wherein the cross-over is cross-over from an active 3D stereo system using shutter mechanisms in order to present separate images to a left eye and a right eye, whereby shutter times for each eye overlap.

5. The method of claim 1, wherein the perceptual model includes a plurality of user sensitivities and wherein a computational effort associated with adjusting portions of the images is determined, at least in part, based on expected user sensitivity to pollution in those portions of the images.

6. The method of claim 1, wherein the perceptual model comprises a contrast sensitivity function, threshold-vs-intensity, saliency prediction and visual masking.

7. The method of claim 1, further comprising receiving input data related to artist indication of view attention and a computational effort associated with adjusting portions of the images is determined, at least in part, based on expected user sensitivity to light pollution in those portions of the images.

8. The method of claim 1, further comprising:
  determining a light pollution likelihood map, which indicates for a plurality of portions of an image or images a likelihood measure for the light pollution portion; and
  using the likelihood measure for a portion of the plurality of portions to determine an amount of computation to perform.

9. The method of claim 8, further comprising using likelihood map coefficients as weights in a weighted optimization.

10. The method of claim 1, wherein the adjustments to the compensated images are limited from frame to frame such that transitions over time are smoothed.

11. A method for generating a pair of modified images to be viewable on a 3D display from a pair of input images, the generating done using a computer based on scene geometry obtained from computer-readable storage and animation data representing changes over time of elements of the scene geometry, such that perception of cross-over illumination from one image of the pair to the display of the other image of the pair is reduced in the pair of modified images relative to display of the pair of input images, the method comprising:
  reading in the pair of input images;
  determining, from the pair of input images to be displayed and/or characteristics of a display system that is to display images, what image cross-over illumination might be present from one of the pair of input images to a viewer eyepiece for the other of the pair of input images;
  subtractively compensating, for at least some of the cross-over illumination, resulting in an indication of residual cross-over illumination; and
  perceptually compensating, for at least some of the residual cross-over illumination, to form the pair of modified images, wherein perceptually compensating comprises determining with a perceptual weighting function modification values for the pair of input images that would be expected to reduce perception of the residual cross-over illumination.

12. The method of claim 11, wherein perceptually compensating comprises:
  determining an initial visibility of the residual cross-over illumination according to perceptual metrics determined from parameters representing, threshold-vs-intensity, visual masking between frequency bands, saliency, contrast thresholds, disparity and motion information;
  generating a weight map according to the initial visibility of the residual cross-over illumination; and
  generating the pair of modified images by reducing a difference according to a perceptual norm between the pair of input images and the pair of input images with the residual cross-over illumination.

13. The method of claim 11, wherein the 3D display is a projection system.

14. The method of claim 11, wherein the 3D display is a 3D LCD display.

15. The method of claim 11, wherein the method also compensates for the perception of cross-over illumination due to scattering of light between displays.

16. An image processor that receives a plurality of images to be viewable with a display system expected to be used where cross-over is present, cross-over being the illumination of one portion of an image by light intended for another portion of the image or another image, the image processor comprising:

inputs for parameters relating to the desired one or more images to be displayed and/or characteristics of the display system;

logic for determining, from the input parameters, what image cross-over might be present;

logic for computing one or more compensated images representing an inverse of the images and cross-over such that the compensated images are calculated to result in approximately the desired images once displayed, including logic for compensating for negative light values by treating the negative light values as nonnegative values and using a stored perceptual model comprising a perceptual weighting function to adjust the compensated images to reduce perception of nonnegative light artifacts; and storage or transmission hardware for storing or transmitting the resulting images as the images to be displayed.

17. The image processor of claim 16, wherein the cross-over is cross-over from a stereoscopic pair of images.

18. The image processor of claim 16, wherein the cross-over is cross-over from concave screen screen-to-screen reflections.

19. The image processor of claim 16, wherein the cross-over is cross-over from an active 3D stereo system using shutter mechanisms in order to present separate images to a left eye and a right eye, whereby shutter times for each eye overlap.

20. The image processor of claim 16, wherein the perceptual model includes a plurality of user sensitivities and wherein a computational effort associated with adjusting portions of the images is based, at least in part, on expected user sensitivity to pollution in those portions of the images.

21. The image processor of claim 16, wherein the perceptual model comprises a contrast sensitivity function, threshold-vs-intensity, saliency prediction and visual masking.

22. The image processor of claim 16, further comprising logic for processing input data related to artist indication of view attention and a computational effort associated with adjusting portions of the images based, at least in part, on expected user sensitivity to light pollution in those portions of the images.

23. The image processor of claim 16, further comprising:

storage for a light pollution likelihood map that indicates, for a plurality of portions of an image or images, a likelihood measure for the light pollution portion; and logic for using the likelihood measure for a portion of the plurality of portions to determine an amount of computation to perform.

24. The image processor of claim 23, wherein likelihood map coefficients are weights in a weighted optimization.

25. The image processor of claim 16, wherein the adjustments to the compensated images are limited from frame to frame such that transitions over time are smoothed.

* * * * *